(12) United States Patent
Grebien et al.

(10) Patent No.: US 10,808,603 B2
(45) Date of Patent: Oct. 20, 2020

(54) TURBOCHARGER ARRANGEMENT IN ENGINE SYSTEMS

(71) Applicant: Caterpillar Motoren GmbH & Co. KG, Kiel (DE)

(72) Inventors: Jan Grebien, Molfsee (DE); Sebastian Eggers, Kiel (DE); Volker Abraham, Kiel (DE); Werner Rebelein, Kiel (DE); Yujie Huang, Wuxi (CN)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 0 days.

(21) Appl. No.: 16/335,611

(22) PCT Filed: Oct. 25, 2017

(86) PCT No.: PCT/EP2017/077374
§ 371 (c)(1),
(2) Date: Mar. 21, 2019

(87) PCT Pub. No.: WO2018/077988
PCT Pub. Date: May 3, 2018

(65) Prior Publication Data
US 2019/0301353 A1 Oct. 3, 2019

(30) Foreign Application Priority Data

Oct. 31, 2016 (GB) .................................. 1618348.5

(51) Int. Cl.
*F02B 37/00* (2006.01)
*F02B 33/40* (2006.01)
(Continued)

(52) U.S. Cl.
CPC .............. *F02B 37/00* (2013.01); *F02B 33/40* (2013.01); *F02B 37/02* (2013.01); *F02B 67/10* (2013.01);
(Continued)

(58) Field of Classification Search
CPC .......... F02B 37/00; F02B 37/02; F02B 33/40; F02B 67/10; F02C 6/12; F02F 7/0068;
(Continued)

(56) References Cited

U.S. PATENT DOCUMENTS 4,235,484 A 11/1980 Owen et al.
6,256,990 B1 * 7/2001 Itoh .......................... F01D 9/026
60/323
(Continued)

FOREIGN PATENT DOCUMENTS

DE 2445474 A1 4/1976
DE 2911682 A1 10/1980
(Continued)

OTHER PUBLICATIONS

International Search Report for related Application No. PCT/EP2017/077374; dated Dec. 15, 2017.
(Continued)

*Primary Examiner* — Mark A Laurenzi
*Assistant Examiner* — Loren C Edwards

(57) ABSTRACT

An engine system includes an engine with a crankshaft. The crankshaft is rotatable about a crankshaft axis that is defined in a first plane. A turbocharger includes a turbine and a compressor. The turbine is configured to be driven by an exhaust gas flow from the engine and drive the compressor about a common turbocharger axis. An included angle defined between a projection of the common turbocharger axis onto the first plane and the crankshaft axis is an acute angle.

11 Claims, 4 Drawing Sheets

(51) Int. Cl.
*F02C 6/12* (2006.01)
*F02B 67/10* (2006.01)
*F02B 37/02* (2006.01)
*F02F 7/00* (2006.01)

(52) U.S. Cl.
CPC .............. *F02C 6/12* (2013.01); *F02F 7/0068* (2013.01); *Y02T 10/144* (2013.01)

(58) Field of Classification Search
CPC ..... Y02T 10/144; F04D 29/40; F04D 29/403; F05D 2250/30
See application file for complete search history.

(56) References Cited

U.S. PATENT DOCUMENTS

| | | |
|---|---|---|
| 7,310,947 B2 | 12/2007 | Baumann |
| 8,353,158 B2 | 1/2013 | Purdey et al. |
| 9,228,488 B2 | 1/2016 | Atz et al. |
| 2005/0172629 A1 | 8/2005 | Baumann |
| 2012/0006019 A1 | 1/2012 | Laube et al. |
| 2013/0232969 A1 | 9/2013 | Luehrmann et al. |
| 2014/0182284 A1 | 7/2014 | Ozolins et al. |
| 2014/0190164 A1* | 7/2014 | Atz ........................ F02B 37/004 60/612 |
| 2015/0337721 A1 | 11/2015 | Kocher |

FOREIGN PATENT DOCUMENTS

| | | | |
|---|---|---|---|
| DE | 202010007768 U1 * | 8/2010 | ............ F02B 37/004 |
| DE | 202010007768 U1 | 8/2010 | |
| JP | S63-190526 U | 12/1988 | |
| JP | 2005-061337 A | 3/2005 | |
| JP | 2013-060820 A | 4/2013 | |
| WO | WO 97/10420 A1 | 3/1997 | |

OTHER PUBLICATIONS

Search Report for related United Kingdom Application No. 1618348.5; dated Mar. 27, 2017.

* cited by examiner

TURBOCHARGER ARRANGEMENT IN ENGINE SYSTEMS

CROSS-REFERENCE TO RELATED APPLICATION

This Application is a 35 USC § 371 US National Stage filing of International Application No. PCT/EP2017/077374 filed on Oct. 25, 2017 which claims priority under the Paris Convention to United Kingdom Patent Application No. 1618348.5 filed on Oct. 31, 2016.

TECHNICAL FIELD

The present disclosure relates to an engine system. More particularly, the present disclosure relates to an arrangement and a connection of a turbocharger relative to an engine of the engine system that helps enhance turbocharger packaging and turbocharger efficiency.

BACKGROUND

Turbochargers are commonly used in internal combustion engines (or simply engines) to boost the engine's power. It is well known for turbochargers to include a turbine and a compressor. Generally, the turbine is coupled to the engine via an exhaust conduit, and driven by a flow of exhaust gases exiting the engine through the exhaust conduit, while the compressor is coupled to the engine via an intake conduit to deliver compressed air to the engine though the intake conduit. Several of the presently available engine assembling strategies cause the exhaust conduits and the intake conduits to be bent and convoluted with relatively steep curvatures that inevitably increase associated material costs and assembling efforts. Therefore, there has been an increased desire to package such connections, and the turbocharger in general, with higher levels of space, material, and cost efficiency. However, finding an efficient connection strategy, with a desired (or a better) level of turbocharger performance, has remained a daunting task.

U.S. Pat. No. 9,228,488 ('488 reference) relates to a duct for connection between an exhaust manifold and a high-pressure turbine defining a longitudinal axis. The duct includes a frustoconical outlet nozzle connected at one end of the duct body and extending at from eighty to ninety degrees from the longitudinal axis.

SUMMARY OF THE INVENTION

In one aspect, the disclosure is directed towards an engine system. The engine system includes an engine and a turbocharger. The engine includes a crankshaft. The crankshaft is rotatable about a crankshaft axis that is defined in a first plane. The turbocharger includes a turbine and a compressor. The turbine is configured to be driven by an exhaust gas flow from the engine and drive the compressor about a common turbocharger axis. An included angle defined between a projection of the common turbocharger axis onto the first plane and the crankshaft axis is an acute angle.

In another aspect, the disclosure relates to an arrangement for an engine system. The engine system includes an engine with a crankshaft. The crankshaft is rotatable about a crankshaft axis defined in a first plane. The arrangement includes a turbocharger with a turbine and a compressor. The turbine is configured to be driven by an exhaust gas flow from the engine and drive the compressor about a common turbocharger axis. An included angle defined between a projection of the common turbocharger axis onto the first plane and the crankshaft axis is an acute angle.

In yet another aspect, the disclosure is directed to a method for arranging a turbocharger with an engine. The engine includes a crankshaft rotatable about a crankshaft axis. The crankshaft axis is defined in a first plane. The turbocharger includes a turbine and a compressor. The turbine is configured to be driven by an exhaust gas flow from the engine and drive the compressor about a common turbocharger axis. The method includes positioning the turbocharger such that an included angle defined between a projection of the common turbocharger axis onto the first plane and the crankshaft axis is an acute angle.

DETAILED DESCRIPTION

Figure 1:
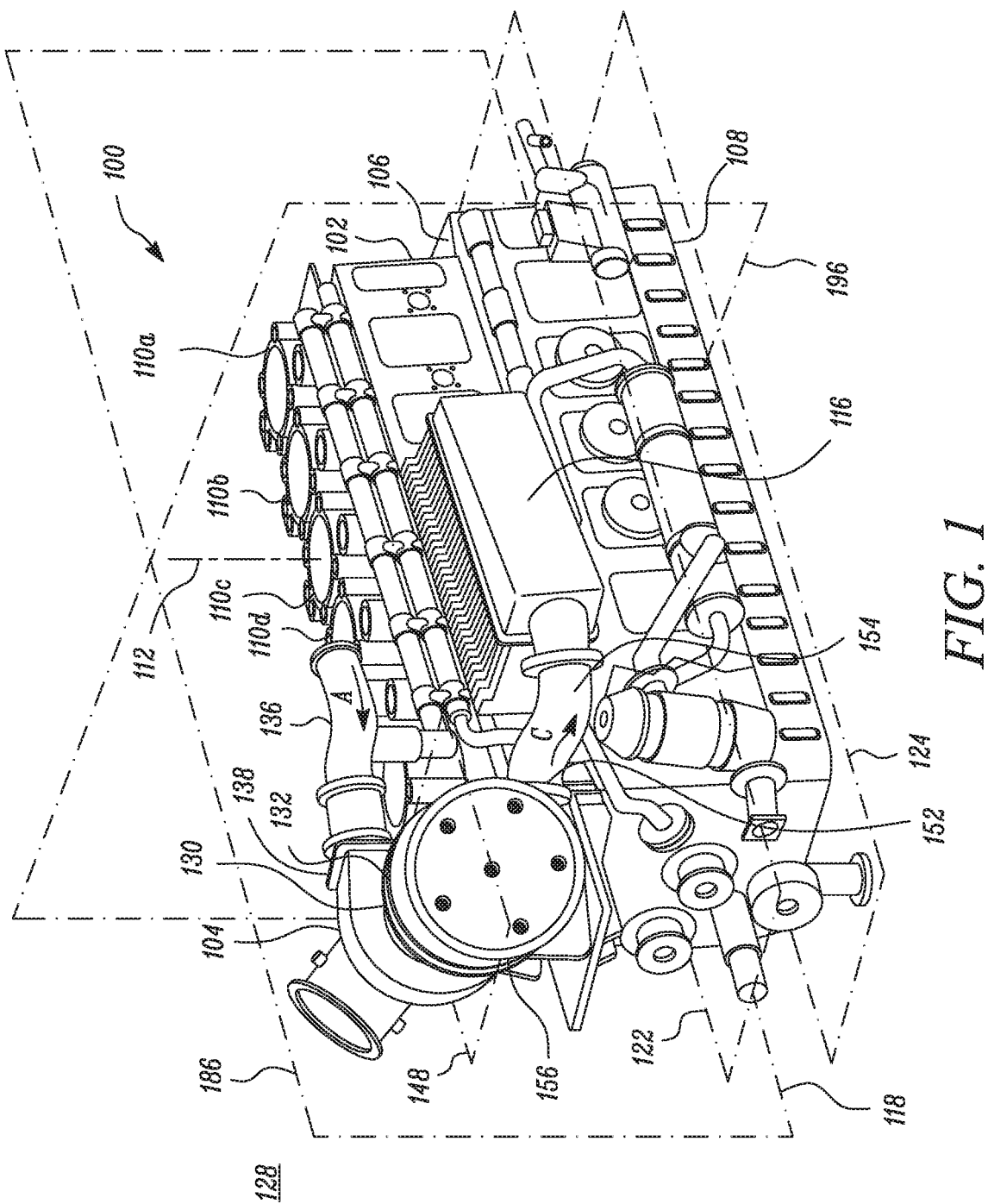
FIG. 1 is an isometric view of an exemplary engine system, illustrating a number of planes that serve as references, and relative to which an arrangement of a turbocharger of the engine system is ascertained, in accordance with the concepts of the present disclosure.
Figure 2:
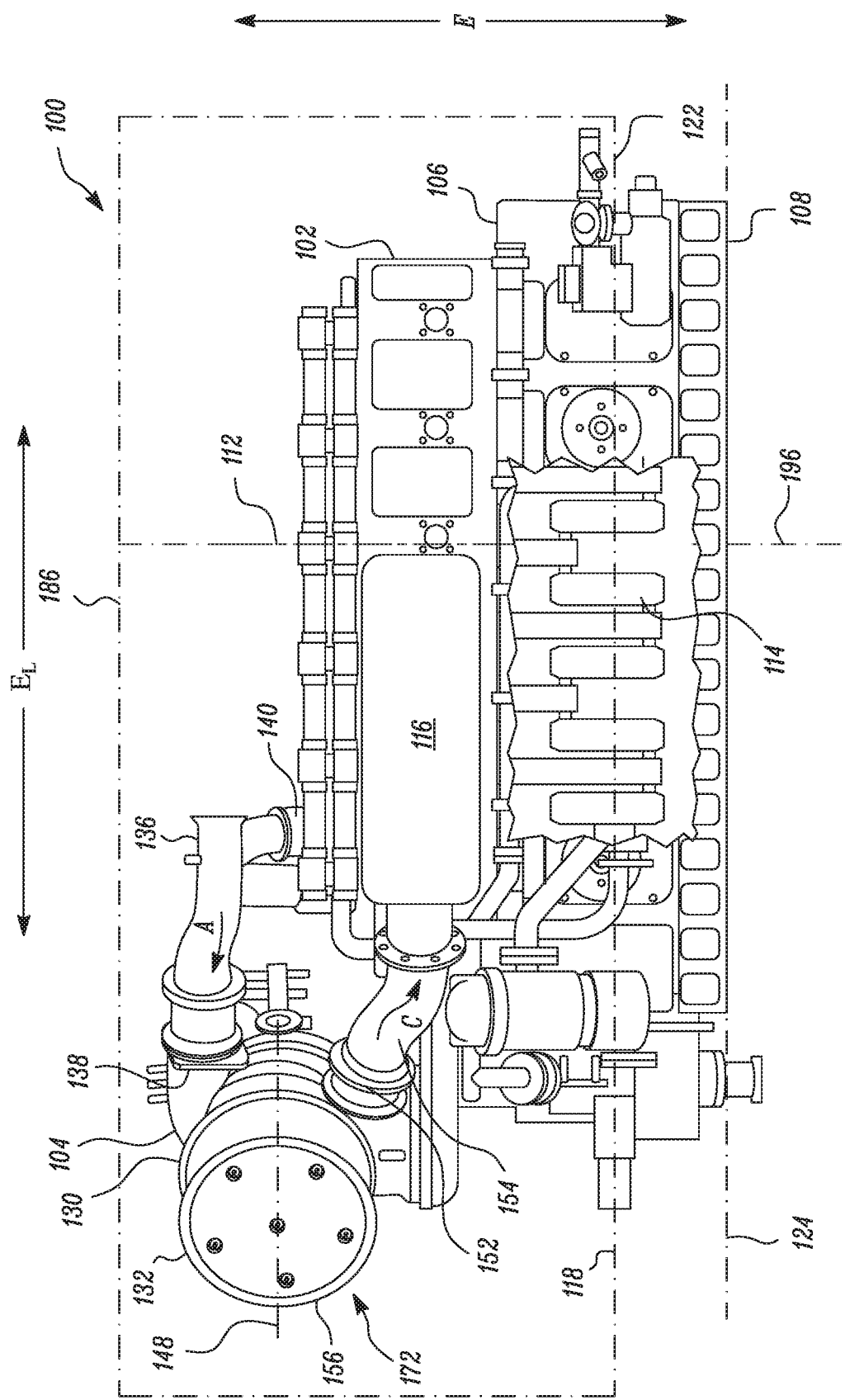
FIG. 2 is a side view of the engine system, depicting one or more aspects of the engine system.
Figure 3:
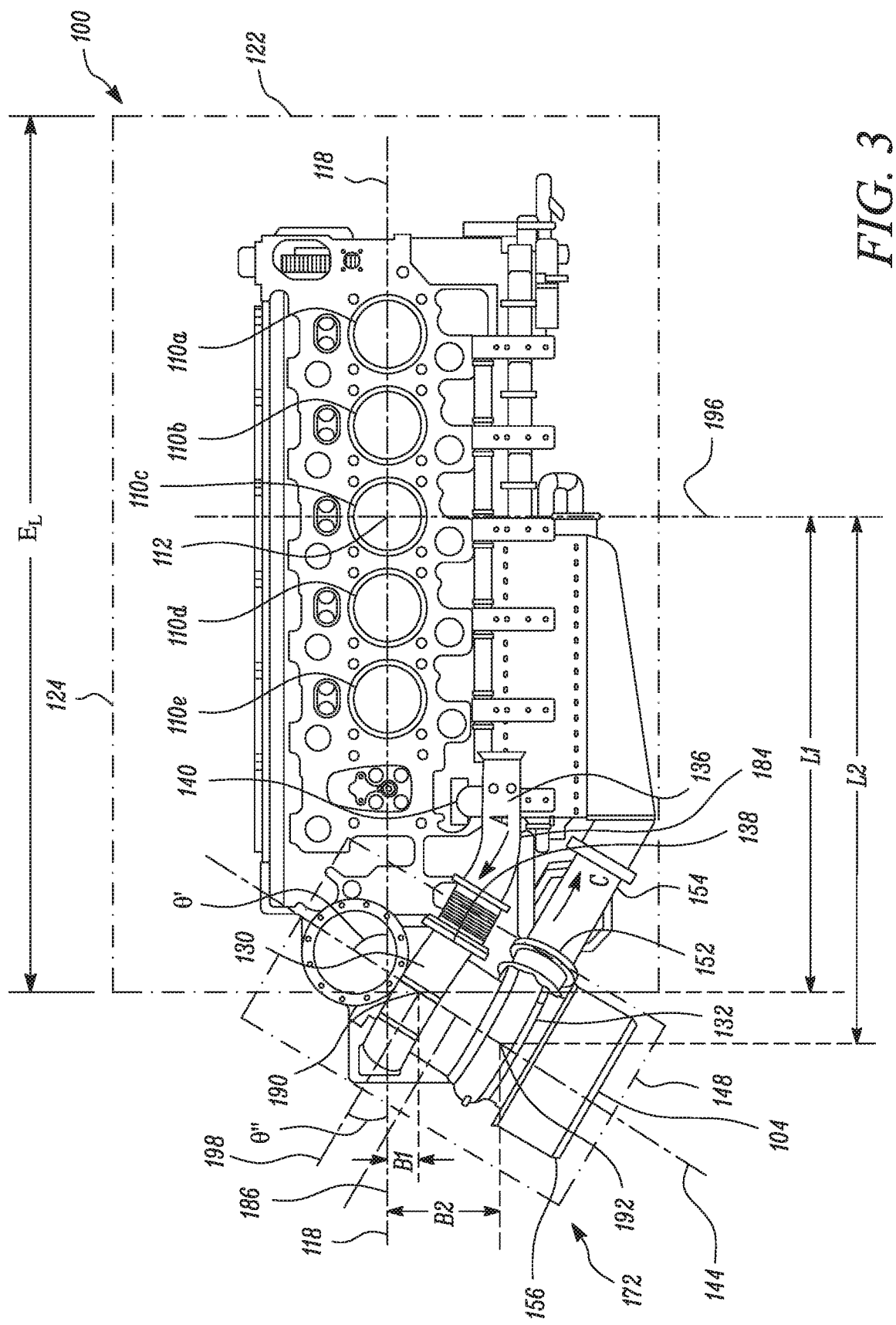
FIG. 3 is a top view of the engine system, depicting additional aspects of the engine system.

Referring to FIGS. 1, 2, and 3, an exemplary engine system 100 is shown. The engine system 100 includes an engine 102 and a turbocharger 104. The engine system 100 may be applied in machines such as construction machines, generator sets, locomotives, marine applications, and other power based applications. In one example, uses of the engine system may also be extended to several domestic and commercial power-based applications. Reference will now be made in detail to specific embodiments or features, examples of which are illustrated in the accompanying drawings. Wherever possible, the same reference numbers will be used throughout the drawings to refer to the same or the like parts.

The engine 102 may include or represent any type of an internal combustion engine, including a gasoline engine, a spark-ignition engine, a compression-ignition engine, a gaseous fuel-powered engine, and the like. The engine 102 may include an engine block 106 with a base 108, a number of combustion cylinders (or simply cylinders 110a, 110b, 110c, 110d, and 110e) with a cylinder axis 112, and a crankshaft 114 (see FIG. 2).

The engine 102 may include a multi-cylinder configuration, for example including 5-cylinders 110a, 110b, 110c, 110d, and 110e, as shown. The cylinders 110a, 110b, 110c, 110d, and 110e, may be arranged according to an inline cylinder configuration, for the engine 102. However, more or less number of cylinders 110a, 110b, 110c, 110d, and 110e, may also be applicable. The cylinders may be individually referred to as a first cylinder 110a, a second cylinder 110b, a third cylinder 110c, a fourth cylinder 110d, and a fifth cylinder 110e (see FIG. 3). For ease in reference and understanding, only the cylinder 110c is annotated and generally referred throughout the present disclosure. It will be understood that discussions pertaining to the cylinder 110c may be equivalently applied to each of the remaining cylinders as well.

The crankshaft 114 may be coupled to one or more pistons (not shown) assembled within the cylinders 110a, 110b, 110c, 110d, and 110e, such that a slidable (or reciprocal) movement of the pistons along a height of the cylinders 110a, 110b, 110c, 110d, and 110e, translates into a rotation of the crankshaft 114, as is customary. In this regard, the crankshaft 114 may rotate about a crankshaft axis 118. For the purpose of the present disclosure, the crankshaft axis 118 is defined in a first plane 122 which is parallel to a base plane 124 defined by the base 108 of the engine block 106. Additionally, the first plane 122 is perpendicular to the cylinder axis 112, as well. In general, the engine 102 may be a four-stroke internal combustion engine. However, the engine 102 may also operate according to a two-stroke principle. Further, the engine 102 includes a charge cooler 116 that is configured to increase a volumetric efficiency of a volume of compressed air delivered by the turbocharger 104 to the engine 102 (direction, C). Although a configuration of the engine 102 is disclosed, aspects of the present disclosure need not be limited to any particular engine type.

The turbocharger 104 is fluidly coupled to the engine 102 in a known manner. The turbocharger 104 is configured to boost the engine 102's power by drawing in compressed air, sourced from an external environment 128, into the cylinders 110a, 110b, 110c, 110d, and 110e, of the engine 102. In this regard, the turbocharger 104 includes a turbine 130 and a compressor 132.

The turbine 130 is configured to be driven by an exhaust gas flow received from the engine 102 (or from the one or more cylinders 110a, 110b, 110c, 110d, and 110e, of the engine 102). To this end, the turbocharger 104 includes an exhaust conduit 136 that is coupled between a turbine inlet 138 of the turbine 130 and an exhaust port 140 (see FIGS. 2 and 3) of the engine 102. At an end of each exhaust stroke or a four-stroke operational cycle in the engine 102, a quantity of exhaust gas generated as a by-product of combustion may be discharged via the exhaust port 140 into the exhaust conduit 136, and be further transferred into the turbine 130 via the turbine inlet 138 (see direction, A). As the inflowing quantity of exhaust gas may strike against a set of blades (not shown) of the turbine 130, an inner energy of the inflowing exhaust gas may be translated into a rotation of the blades of the turbine 130. A movement of the turbine 130 may in turn cause the movement of the compressor 132; that is a rotation of the turbine 130 translates to a rotation of the compressor 132. Such a translation of rotation between the turbine 130 and compressor 132 may occur about a common turbocharger axis 144. More specifically, the turbine 130 is configured to be driven by the exhaust gas flow from the engine 102 and is further configured to drive the compressor 132 about the same axis, i.e. the common turbocharger axis 144. In some implementations, the common turbocharger axis 144 is defined in a second plane 148 that is parallel to the first plane 122, and in so doing the turbocharger 104's arrangement (or the common turbocharger axis 144) may remain substantially horizontal relative to an elevation, E, of the engine 102.

The compressor 132 includes a compressor outlet 152. As with the connection of the turbine inlet 138 with the exhaust port 140 via the exhaust conduit 136, the turbocharger 104 includes an intake conduit 154 coupled between the compressor outlet 152 and an intake port (not shown) of the engine 102. In so doing, the compressor 132 is able to draw in a quantity of air via an air inlet 156 by the generation of a suction force resulting from the compressor 132's rotation, and subsequently deliver (direction, C) a volume of compressed air to the cylinders 110a, 110b, 110c, 110d, and 110e, for boosting the engine 102's power. As shown, the air inlet 156 is configured to be in abutment with the compressor 132, and is positioned axially to both the turbine 130 and the compressor 132 (i.e. along the common turbocharger axis 144)—this configuration however need not be seen as being limiting in any way. In some implementations, a coupling of the intake conduit 154 may extend from the compressor outlet 152 to the intake port via the charge cooler 116. In general, details of such an arrangement and a working of the turbocharger 104 follows a general practice of the art, and therefore, will not be discussed any further.

Figure 4:
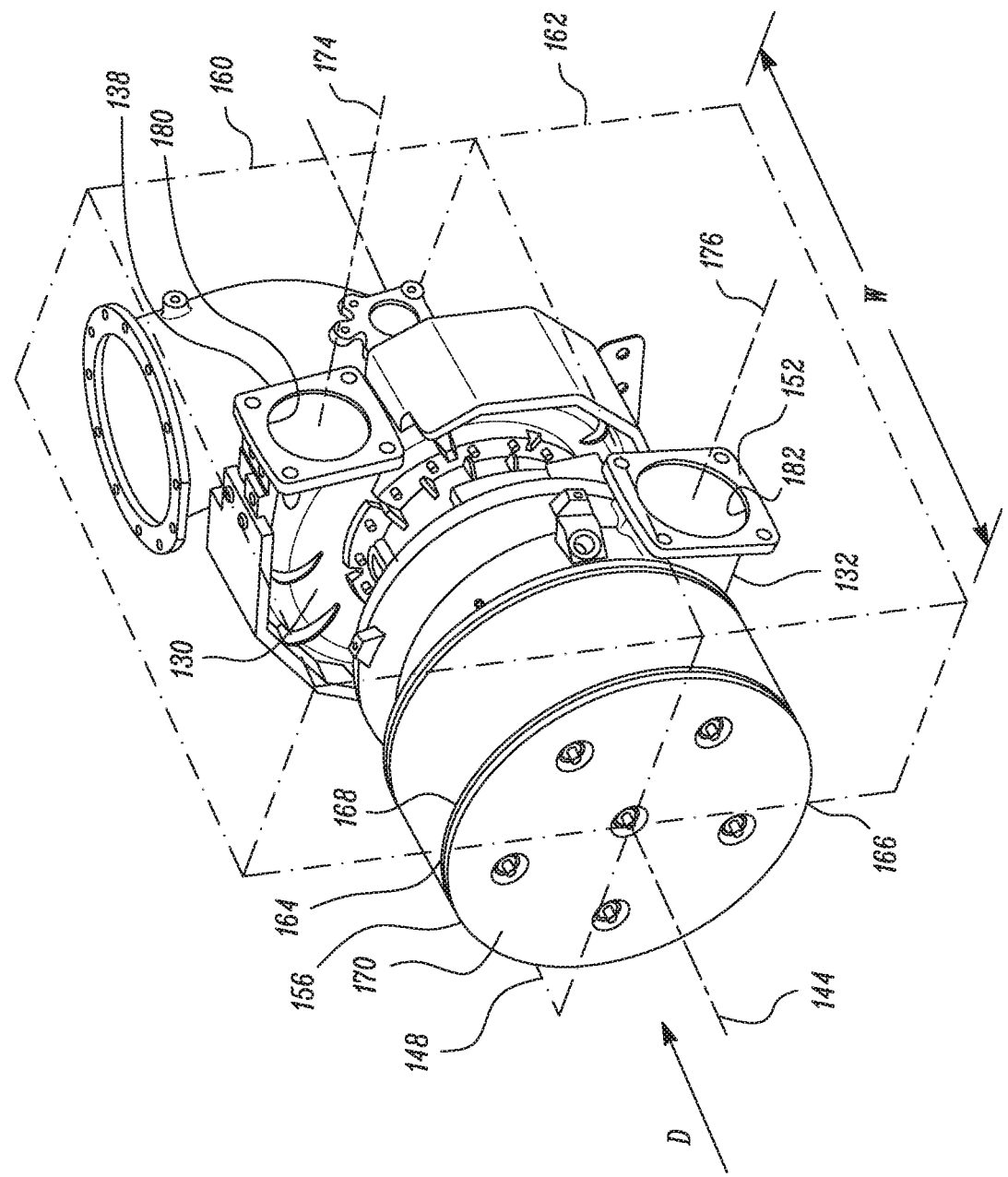
FIG. 4 is a perspective view of the turbocharger of the engine system, depicting one or more aspects of the turbocharger, in accordance with the concepts of the present disclosure.

Referring to FIG. 4, in one implementation, the turbocharger 104 defines two successive quadrants—a first quadrant 160 and a second quadrant 162. More particularly, the quadrants 160, 162, may be defined along a curvature of the turbocharger 104, extending from a first peripheral point (vertex 164 defined on the air inlet 156) all the way to a second peripheral point (vertex 166 defined halfway around the air inlet 156). An axis (not shown) passing through the vertices 164, 166 may divide the turbocharger 104 in substantial halves—with the quadrants 160, 162 in combination forming one half (or a first half 168). As seen from the view provided in FIG. 4, or envisioned from an axial end 170 of the turbocharger 104 (see direction, D), the quadrants 160, 162 also extend along an expanse of the turbocharger 104, along the common turbocharger axis 144. In that manner, the first quadrant 160 generally accommodates the turbine inlet 138, and the second quadrant 162 generally accommodates the compressor outlet 152. In that manner, the first half 168 of the turbocharger 104, defined by the quadrants 160, 162, substantially accommodates both the compressor outlet 152 and the turbine inlet 138.

The turbine inlet 138 and the compressor outlet 152 may be arranged and extended substantially tangentially outwardly, from the first half 168 of the turbocharger 104. Although a minimum extent of angular variation may exist between the respective extensions of the turbine inlet 138 and the compressor outlet 152, a turbine inlet axis 174 and a compressor outlet axis 176 defined respectively by these extensions may extend largely parallely in the same direction. In so doing, openings 180, 182 respectively of both the turbine inlet 138 and the compressor outlet 152 are also generally revealed towards the same direction (see FIG. 4). In that manner, the compressor outlet 152 and the turbine inlet 138 impart a substantial U-shaped profile to the turbocharger 104, from the axial end 170 (see direction, D) of the turbocharger 104.

The forthcoming description pertains to further structural details of the turbocharger 104. The forthcoming description also includes an arrangement 172 of the turbocharger 104 relative to the engine 102. To envision these descriptions each of the FIGS. 1, 2, 3, and 4, may need to be collectively viewed.

Referring again to FIG. 3, given such a turbocharger 104 profile, as has been described above, an aspect of the present disclosure is directed towards the arrangement 172 of the turbocharger 104 relative to the engine 102. In particular, the turbocharger 104 is positioned relative to the engine 102 such that both the turbine inlet 138 and the compressor outlet 152 may face or be directed generally or at least partially towards the engine 102 (see FIG. 3). In such an arrangement, the common turbocharger axis 144 may extend substantially diagonally across the plan view of the engine 102 (see FIG. 3). Such positioning ensures that at least the exhaust conduit 136, fluidly extended between the turbocharger 104 and the engine 102, may refrain from inheriting one or more bends or curvatures 184 that are relatively steep and/or sharp in profile. With such positioning, the intake conduit 154 may refrain from having steep curvatures, as well.

In one implementation, the exhaust conduit 136 may include one or more such curvatures 184 defined at an angle greater than 150 degrees. In some implementations, an arrangement and positioning of the turbocharger 104 is such that an included angle (θ', see FIG. 3) defined between a projection of the common turbocharger axis 144 onto the first plane 122 (see FIG. 3) and the crankshaft axis 118 is an acute angle (see FIG.). In such an embodiment, the acute angle may lie within an exemplary angular range of 50 degrees to 70 degrees. In yet another embodiment, the acute angle may be equal to 60 degrees.

Referring to FIG. 3, a top view or a plan view of the engine system 100 is shown. As may be viewed and understood in this view, the turbocharger 104 is generally arranged angularly relative to the engine 102 (or to the crankshaft axis 118). In this configuration of the turbocharger 104, it may be visualized and understood that the turbine 130 is placed generally (diagonally) closer to the engine block 106 than the compressor 132. More particularly, a longitudinal plane 186 is defined by the cylinder axis 112 and the crankshaft axis 118. The longitudinal plane 186 may be defined and extended along a length $E_L$ of the engine 102, as shown. A configuration of the turbocharger 104 is such that a displacement B1 between a center 190 of the turbine 130 and the longitudinal plane 186 is shorter compared to a displacement B2 between a center 192 of the compressor 132 and the longitudinal plane 186. Moreover, the cylinder axis 112 may also be defined in a lateral plane 196 disposed laterally (or perpendicularly) to the length $E_L$ of the engine 102. In that way, the lateral plane 196 is perpendicular to the crankshaft axis 118 and the longitudinal plane 186, and a configuration of the turbocharger 104 is such that a displacement L1 between the center 190 of the turbine 130 and the lateral plane 196 is shorter compared to a displacement L2 between the center 192 of the compressor 132 and the lateral plane 196. Further, a transverse axis 198 is defined by the turbocharger 104 that is perpendicular to the common turbocharger axis 144 and is in line to the second plane 148. A projection of the transverse axis 198 on the first plane 122 is such that the projection makes an angle (θ") with the crankshaft axis 118, with the angle (θ") exemplarily lying within a range of 20 degrees to 40 degrees. In one embodiment, the angle (θ") may be equal to 30 degrees.

INDUSTRIAL APPLICABILITY

In assembly, or during an arrangement of the turbocharger 104 with respect to the engine 102, a width, W, of the turbocharger 104 requires to be adapted to a distance between the intake port and the exhaust port 140 of the engine 102. Additionally, as it is desirable to have the exhaust conduit 136 (and preferably intake conduit 154) inherit negligible or relatively small curvatures and bends, a positioning of the turbocharger 104 is such that the first plane 122 remains parallel to the second plane 148 and a projection of the common turbocharger axis 144 on the first plane 122 makes an acute angle (see included angle θ') with the crankshaft axis 118, as has already been discussed above. In that way, the turbocharger 104 remains substantially horizontally aligned relative to the elevation, E, of the engine 102. Further, positioning of the turbocharger 104 to the engine 102 also includes positioning the turbocharger 104 such that the center 190 of the turbine 130 is closer to both the longitudinal plane 186 and the lateral plane 196, as compared to the center 192 of the compressor 132.

With such an arrangement, the turbocharger 104 attains a position that at least partially directs both the turbine inlet 138 and the compressor outlet 152 towards the engine 102. As a result, the turbocharger 104 assumes a position closer to the engine 102 when compared to conventional arrangements. By arranging or positioning the turbocharger 104 closer to the engine 102, a packaging and a footprint of the engine system 100, as a whole, is reduced, and which in turn mitigates challenges related to spatial constrains that may be encountered during shipping and transportation, for example. Additionally, steep conduit curvatures, conduit convolutions, conduit windings around a portion of the engine system 100, and the like, may be appropriately avoided. Instead, conduits 136, 154 of the arrangement 172 may include the curvatures 184 that are angled above 150 degrees, promoting more efficient airflow through the conduits 136, 154, and in turn enhancing turbocharger performance and efficiency. Moreover, closer packaging of the turbocharger 104 relative to the engine 102 also leads commensurately lesser conduit lengths, lesser material, and lesser costs, for assembling the engine system 100.

Although a position and arrangement of the turbocharger 104 has been discussed relative to the third cylinder 110c, it will be appreciated that the turbocharger 104 may remain similar in orientation and position relative to each of the remaining cylinders 110a, 110b, 110d, and 110e, as well.

It should be understood that the above description is intended for illustrative purposes only and is not intended to limit the scope of the present disclosure in any way. Thus, one skilled in the art will appreciate that other aspects of the disclosure may be obtained from a study of the drawings, the disclosure, and the appended claim.

The invention claimed is:

1. An engine system comprising:
    an engine including a crankshaft, the crankshaft being rotatable about a crankshaft axis, the crankshaft axis being defined in a first plane;
    a turbocharger including a turbine and a compressor, the turbine configured to be driven by an exhaust gas flow from the engine and drive the compressor about a common turbocharger axis, wherein:
    an included angle defined between a projection of the common turbocharger axis onto the first plane and the crankshaft axis is an acute angle of less than 70 degrees;
    the common turbocharger axis is defined in a second plane, a transverse axis is defined perpendicularly to the common turbocharger axis and in line with the second plane, and a projection of the transverse axis on the first plane is inclined to the crankshaft axis at an angle that lies within a range of 20 degrees to 40 degrees; and
    the turbocharger is arranged with respect to the engine such that a turbine inlet and a compressor outlet are at least partially directed towards the engine.

2. The engine system of claim 1, wherein the engine includes a base, a base plane being defined by the base, the first plane being parallel to the base plane.

3. The engine system of claim 1, wherein the engine includes at least one combustion cylinder with a cylinder axis, the first plane being perpendicular to the cylinder axis.

4. The engine system of claim 1, wherein the engine includes at least one combustion cylinder with a cylinder axis, a longitudinal plane being defined by the cylinder axis and the crankshaft axis, wherein a displacement between a center of the turbine and the longitudinal plane is shorter compared to a displacement between a center of the compressor and the longitudinal plane.

5. The engine system of claim 1, wherein the engine includes at least one combustion cylinder with a cylinder axis, the cylinder axis being defined in a lateral plane perpendicular to the crankshaft axis, wherein a displacement between a center of the turbine and the lateral plane is shorter compared to a displacement between a center of the compressor and the lateral plane.

6. The engine system of claim 1, further including an exhaust conduit coupled between an exhaust port of the engine and a turbine inlet of the turbine, the exhaust conduit including one or more curvatures defined at an angle greater than 150 degrees.

7. The engine system of claim 1, wherein the compressor outlet and the turbine inlet imparting a substantial U-shaped profile to the turbocharger, from an axial end of the turbocharger.

8. The engine system of claim 1, wherein the acute angle lies within a range of 50 degrees to 60 degrees.

9. The engine system of claim 1, wherein a projection of the transverse axis on the first plane is inclined to the crankshaft axis at an angle of 30 degrees.

10. The engine system of claim 1, wherein the engine includes a number of combustion cylinders defining an inline cylinder configuration for the engine.

11. The engine system of claim 1, wherein the turbine inlet is parallel to the transverse axis.

* * * * *